Dec. 16, 1969     E. G. SUNDBERG     3,484,300
METHOD OF SEALING A BATTERY COVER TO THE CASE
Filed March 10, 1967     3 Sheets-Sheet 1
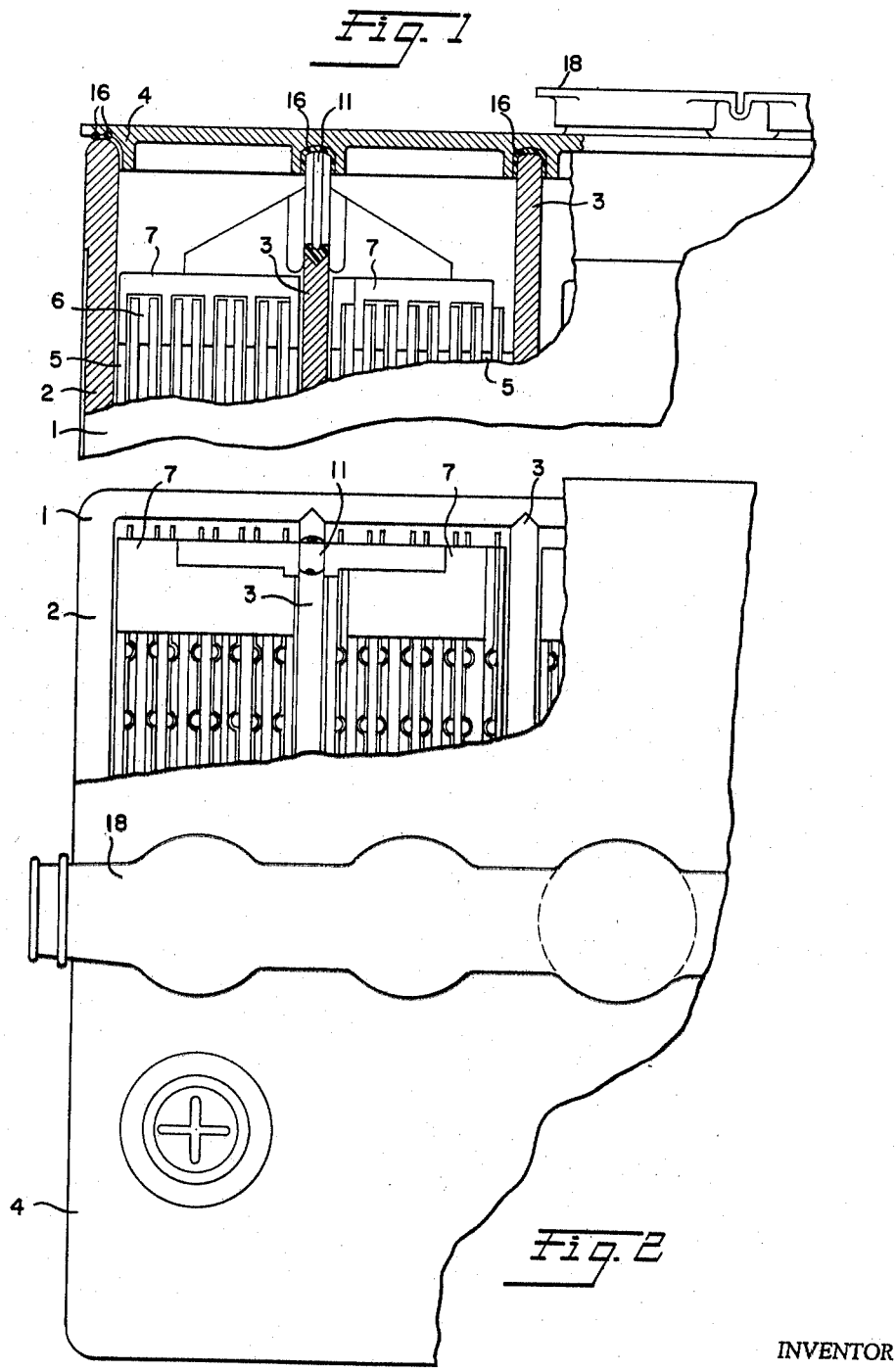
INVENTOR
ERIK G. SUNDBERG
BY
Burns, Doane, Benedict, Swecker & Mathis
ATTORNEYS

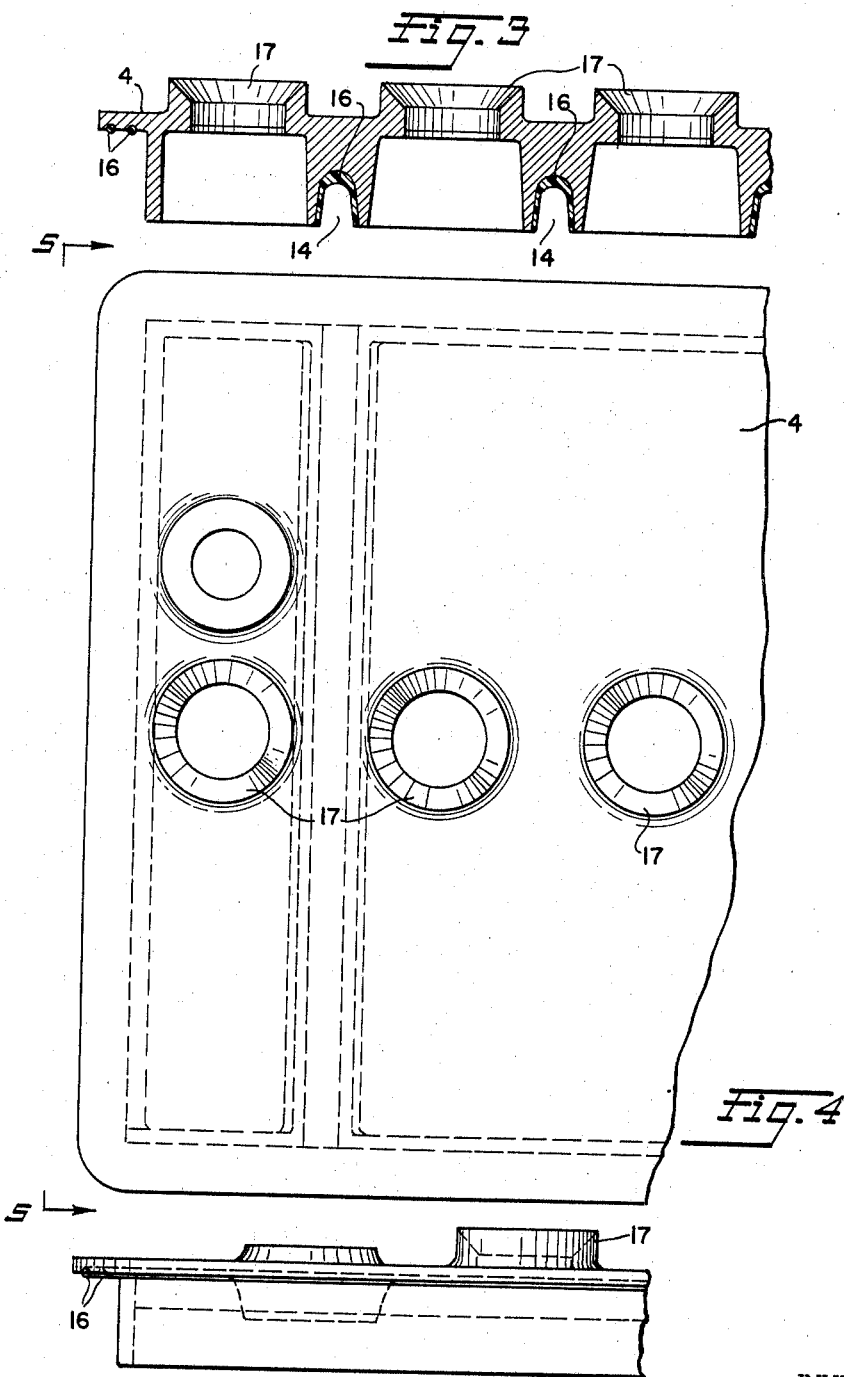

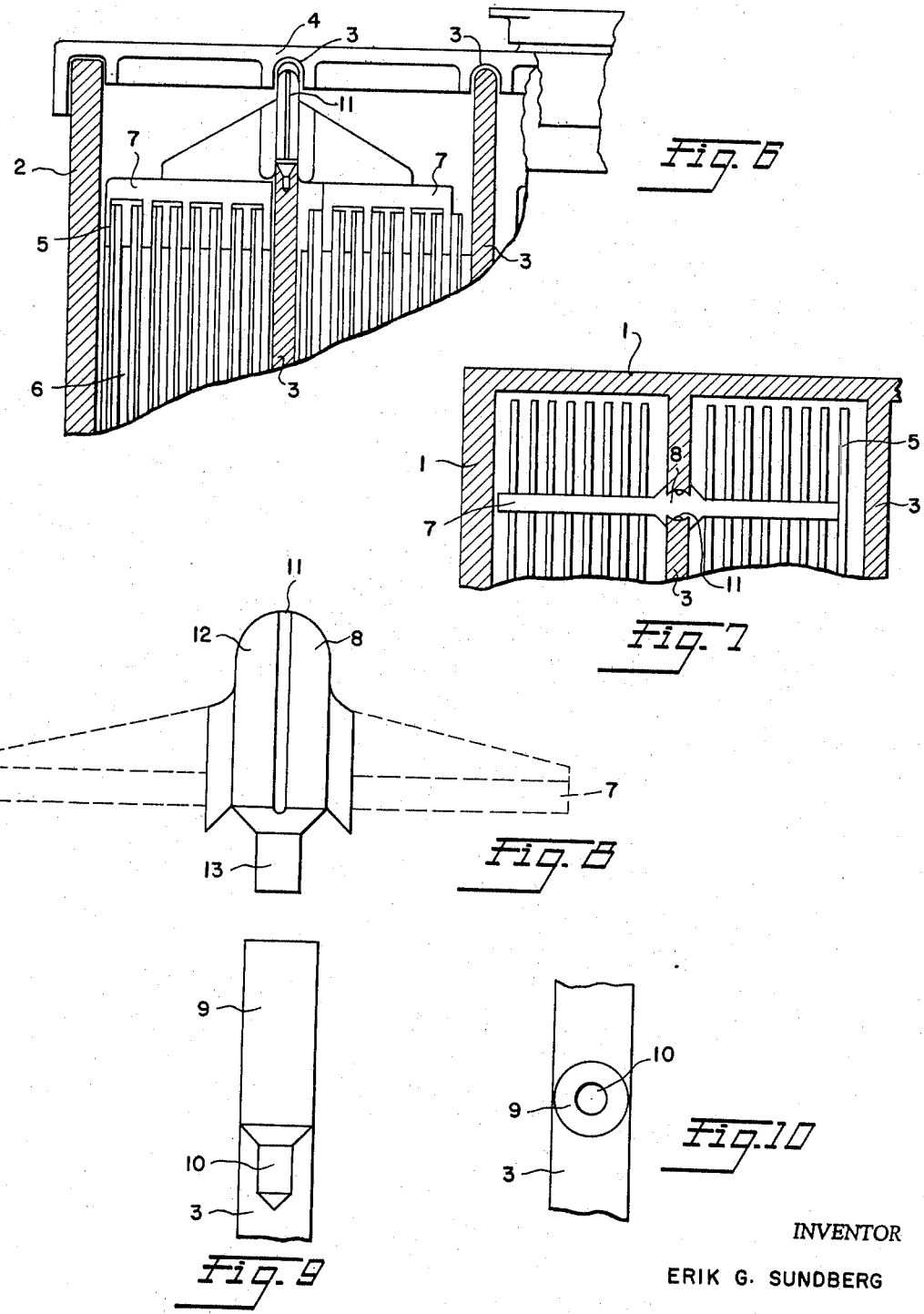

United States Patent Office 3,484,300
Patented Dec. 16, 1969

3,484,300
METHOD OF SEALING A BATTERY COVER TO THE CASE
Erik G. Sundberg, Osbacken, Nol, Sweden, assignor to Aktiebolaget Tudor, Stockholm, Sweden, a corporation of Sweden
Continuation-in-part of application Ser. No. 608,303, Jan. 10, 1967. This application Mar. 10, 1967, Ser. No. 633,329
Claims priority, application Sweden, Jan. 11, 1966, 302/66
Int. Cl. H01m 1/02
U.S. Cl. 136—176     4 Claims

ABSTRACT OF THE DISCLOSURE

This disclosure relates to a multi-cell lead-acid storage battery, such as is used for starting internal combustion engines, where the electrical connections between adjacent cells are located inside the battery and above the liquid electrolyte. A unitary cover is provided which seals all the cells in the battery. The cover is sealed to the battery by a special method where the sealant is first placed on the cover which can be stored and thereafter the upper surfaces of the battery casing are heated and the cover pressed into position to provide an effective seal.

RELATED APPLICATION

This application is a continuation-in-part of my application Ser. No. 608,303, filed Jan. 10, 1967, now abandoned.

BACKGROUND OF INVENTION

Field of invention

This invention relates to a multi-cell accumulator battery, particularly of the lead-acid type which is particularly characterized in that the electrical connections between adjacent cells are located inside the battery casing and a unitary cover is provided which is applied in a novel manner.

Description of prior art

In multi-cell storage batteries each cell usually has its own cover, which is provided with a hole for adding water and releasing gas, and one or two lead-throughs by which connector devices, for example in the form of terminal posts, are carried out to provide electrically conducting connections between the electrode elements of the battery and external circuits, whereby the lead-through sockets usually are liquid-tight cast into the cover to be joined with complete seal to the terminal post by means of welding. But the lead-throughs are always subject to movements and external stresses and as a result of this, leakages occur, by which battery acid can penetrate and form a conductive film on the top of the cover. The inter-cell connectors located on top of the cover are also likely to facilitate short circuits between cells, and moreover, this entire construction is difficult to keep clean. The sealing of the cover against the container edges and walls is usually brought about in that an asphalt-like compound is heated and in liquid condition is filled in around the edges of the covers after these have been put in place. The compound gradually solidifies as it cools while maintaining a certain toughness and softness.

With the existing types of multi-cell battery construction, the connections between cells, which are termed pole bridges, are dimensioned over their whole length for the greatest current densities occurring in any section. The proportions are to some extent determined in this connection in that the connecting of the electrodes to the pole bridges is effected in a conventional manner, that is to say, that the pole bridges which as a rule have a parallelepipedical or nearly parallelepipedical cross-section are in contact by one of the cross-sectional longer sides with all the electrodes of like polarity in a cell, in which connection the electrodes are placed at a distance from each other. The gaps are generally filled by separators.

The pole bridges and their associated plate inserts are connected together in accordance with a given arrangement depending on whether it is a question of series or parallel connection. The connections used for this purpose are usually arranged, as incidentally is generally known, on the outside of the battery cover, in which connection parts of the pole bridges extend from inside the cells out through the cover. It has been proposed to connect together pole bridges and cells placed adjacent to one another, without the connecting parts being led to the outside of the accumulator. The proposal is, as a rule, that the connections shall be arranged inside the cover and that they are guided in this connection through partitions between two cells located adjacent to one another.

This raises packing problems which hitherto have not found a satisfactory solution. Furthermore, it has been found necessary in designing accumulator boxes to take into account the bores in the partitions, which, in view of storage and tooling or mold costs for producing boxes, have proved to be expensive and uneconomical.

Where the lid is sealed not only against the long and short walls of the container, but at the same time against the partitions which separate the individual battery cells, other problems are presented. To bring about a sealing and permanent joint between container and cover, gluing has hitherto been used, and as glue, usually a plastic glue such as epoxy resin has been used. The glue has been placed in grooves or the like arranged in the cover, whereupon the cover has been brought together with the battery container and the glue has been permitted to cure.

To obtain a complete and adequately tight glue joint by this method, it is necessary, however, that the space between the parts be small and that the edges of the parts be even. To meet the tolerance requirements in a production process, the glue joint should be absolutely liquid-tight in all its parts and remain so under changing temperatures. This is a requirement which hitherto has not been met in a satisfactory manner.

SUMMARY OF THE INVENTION

The objects of the invention are to provide a novel battery construction and method of assembly whereby the metallic connecting means members are carried through the partitions dividing the adjacent cells. This results not only in that external inter-cell connections can be obviated, but also in that the container cover can be made in one piece. Because the metallic connectors are inside the battery container, it is possible to reduce the amount of material in the pole bridges and hence obtain a savings in both weight and cost; these pole bridges may advantageously be made to have a variable cross-section to thus have more or less of a uniform current density.

Another feature of the invention is to provide a complete and permanent seal between the battery container and cover, not only around the outer casing walls but also along each partition between adjacent cells, by applying an even coating of a thermoplastic adhesive to the cover at the locations adapted to mate with the casing walls and partitions; and just before the cover is placed on the casing, the upper edges of the casing walls and partitions are heated sufficiently so that the adhesive softens sufficiently to form the desired seal.

Detailed advantages and objects of the invention are stated in the claims and in the description.

BRIEF DESCRIPTION OF DRAWINGS

FIGURE 1 is a partial front elevation in partial section of a battery incorporating the present invention;

FIGURE 2 is a partial plan view of the battery shown in FIGURE 1 with the cover partially removed;

FIGURE 3 is a partial elevation in section of the single cover piece for the battery;

FIGURE 4 is a partial top plan view of the cover, but of the end opposite to that shown in FIGURE 2;

FIGURE 5 is a partial end elevation of the cover taken along line 5—5 of FIGURE 4;

FIGURE 6 is a partial elevation in partial section of a second embodiment showing the electrical connection between the two plates of two adjacent cells extending through the partition between the cells;

FIGURE 7 is a partial plan view in section of the two adjacent cells shown in FIGURE 6;

FIGURE 8 is an elevation to enlarged scale of the connection means which fits in the partition shown in FIGURES 6 and 7;

FIGURE 9 is an elevation in section of the partition; and

FIGURE 10 is a plan view of the partition shown in FIGURE 9.

DESCRIPTION OF PREFERRED EMBODIMENTS

With continued reference to the drawings, a battery or lead accumulator, such as is used as a starter battery in an automobile, conventionally has an outer casing of hard rubber or synthetic plastic which is liquid-tight and contains side walls 1 as shown in FIGURE 1 and 2. The end cell is shown between an end wall 2 and a partition 3 which separates it from the adjacent cell. All the cells in the battery of the present invention are closed at the top as by a single, unitary cover 4 having a separate filler opening 17 for each cell. Caps 18 for openings 17 may be of any desired construction.

The positive and negative electrode plate-like elements are spaced apart by separators 6. It is customary in such batteries that the negative electrode elements 5 of one cell are connected electrically to the positive electrode elements 5 of the adjacent cell, as shown in FIGURES 1 and 2. It is essential that this connection be liquid-tight since the liquid electrolyte in one cell is not the same electrical potential as the electrolyte in the adjacent cell.

Electrodes 5 from each cell are customarily joined through partition 3 to pole bridges 7 in each cell. The pole bridges 7 may be flat plates having generally a triangular configuration. This provides a large current carrying cross-sectional area at the partition and a gradually reduced cross-sectional area as the current division transfers to the individual electrode plates.

To make a connection between the pole bridges 7 of adjacent cells, partition 3 may be formed with an aperture 9 such as illustrated, for example, in FIGURES 9 and 10, through which a connecting means 8 may pass. Connecting means 8 may be integrally formed with pole bridges 7 or provided with surfaces which rigidly engage pole bridges 7 upon assembly so that a good, low resistance connection is made between the electrodes of adjacent cells.

With reference to FIGURES 9 and 10, aperture 9 may comprise a slot formed at the upper side of partition 3. A blind hole 10 is provided at the lower end which is filled with a suitable electrolyte resistant liquid adhesive which will ultimately be displaced and serve as a sealing material. A suitable liquid sealant may, for example, be an epoxy resin, and advantageously, it should expand as it sets. A dependable seal is obtained so long as it does not shrink, and a satisfactory sealant may be a mastic of a non-shrinking latex. The invention does not reside in the choice of any particular packing means.

FIGURE 8 illustrates one form of connection means 8 which may be inserted in aperture 9. Connection means 8 may have body 12, that is here illustrated to be generally cylindrical, and have vertical grooves or recesses 11 on opposite sides. (See also FIGURES 2 and 7.) When connection means 8 is inserted in the partition, grooves 11, together with the aperture walls of the partition, serve as ducts. The lower end 13, having a reduced diameter, acts as a dowel in hole 10 and presses the liquid sealant up into recesses 11 to form a bond with the aperture walls in partition 3. Two sets of plates, one for each adjacent cell, may be secured together by connection means member 8 as a sub-assembly, and thereafter inserted in the partition aperture.

Cover 4, in both the embodiment of FIGURES 1–5 and the embodiment of FIGURES 6–10, is formed to fit the outer walls 2 of the casing and is additionally provided with grooves 14 to fit over partitions 3. Where the connecting means member 8 extends through partitions 3, the upper end of member 8 is shaped to conform with the upper end of the partitions and thus may fit into one of the grooves 14.

In batteries of this type, it is important that the cover be sealed to the upper ends of partitions 3 to make each cell liquid-tight. It has been found that instead of applying the glue to the upper edges of the container and partition, several advantages accrue from applying the adhesive solely around the outer edges of the cover, as shown at 16 in FIGURES 3 and 5, and in grooves 14 at 17.

The sealing compound is conventionally of a thermoplastic type, such as asphalt or a rubber base cement, that is hard at room temperature and becomes fluid at a sufficiently high temperature, for example 60–120° C. This compound may thus be applied in its soft or liquid form to the cover, and distributed uniformly without much effort. Thereafter, the cover may be stored for an indefinite time until its use is desired.

When its use is required for assembling the battery, it is only necessary to heat the upper edges of the battery container including the partitions to such temperature that the sealing compound in the lid, which is applied to the casing with light pressure, softens sufficiently so a liquid-tight permanent bond between the cover and the casing is effected. The heating of the upper edges of the battery may be accomplished by placing the battery casing, which does not have a cover, in place on a conveyor belt which passes beneath an infrared radiation heating zone. Alternatively, it may be heated by pressure against a flat metal plate. The upper edges of the casing walls and partitions may thus be heated to an appropriate temperature much more quickly than if the cover is applied prior to heating, as has been the prior practice. In the prior practice, the heating, which was by radiation directed to the outside of the cover, had to be continued until the sealing compound would flow out beneath the cover in a smooth and uniform pattern to be certain the seal was properly made, and it was never possible to be certain that the cover was adequately sealed to the tops of the partitions. Hence, in the past, the sealing compound in many cases had to be applied to almost the entire cover surface or otherwise applied on the upper edges of the casing and partitions. In either case, when the cover is first applied to the battery casing and thereafter heated, the amount of heat required to soften the sealing compound was far more than is required when the casing is heated prior to placing the cover in position.

Finally, the above method of sealing the cover to the casing can be practiced with the use of existing assembly lines without any change whatsoever in finishing batteries of the type here disclosed.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range

What is claimed and desired to be secured by Letters Patent is:

1. A method of fastening a unitary cover to a multi-cell storage battery comprising the steps of providing a battery case having separate liquid-tight compartments defining each separate cell with a partition serving as the common wall between two adjacent cells, the upper surfaces of the outside casing walls and of the partitions lying in a plane;

providing a cover having on the underside that is adapted to contact the upper surfaces of the casing a peripheral surface that is planar and a plurality of raised portions containing grooves, the bottom surfaces of said grooves being substantially planar;

applying a thermoplastic adhesive in liquid form on the planar peripheral surface and on the bottom groove surfaces of said cover and thereafter storing said covers;

then heating the upper wall casing and partition surfaces of the battery case to a temperature well above the softening temperature of the thermoplastic adhesive but not above the melting temperature of the battery case material; and thereafter placing the cover on said heated casing with the adhesive in contact with the heated surfaces to thereby effect the sealing of the cover on each cell of said battery.

2. The method as defined in claim 1 wherein the heating of the upper casing and partition surfaces is by infrared radiation.

3. The method as defined in claim 1 wherein the heating of the upper casing and partition surfaces is effected by contacting said surfaces with a heated metal plate and thereafter forcing the cover against said heated surfaces to form a liquid-tight joint.

4. The method as defined in claim 1 wherein the adjacent cells of the battery are connected electrically together by connection means of electrically conductive material passing through the partitions at a position above the normal level of the electrolyte and having a portion extending up to the cover, and wherein the cover seal is in part directly in contact with the upwardly extending portion of said connection means.

References Cited

UNITED STATES PATENTS

| 2,875,563 | 3/1959 | Moore | 53—39 |
| 3,298,870 | 1/1967 | Sabatino | 136—170 |

FOREIGN PATENTS

| 658,862 | 1/1965 | Belgium. |
| 1,316,806 | 12/1962 | France. |

WINSTON A. DOUGLAS, Primary Examiner

D. L. WALTON, Assistant Examiner

U.S. Cl. X.R.

53—39; 136—134, 170